US010935698B2

(12) United States Patent
Genier et al.

(10) Patent No.: US 10,935,698 B2
(45) Date of Patent: Mar. 2, 2021

(54) HIGH ASPECT RATIO GLASS WAFER

(71) Applicant: Corning Incorporated, Corning, NY (US)

(72) Inventors: Michael Lucien Genier, Horseheads, NY (US); John Tyler Keech, Painted Post, NY (US); Robert Sabia, Parkland, FL (US)

(73) Assignee: Corning Incorporated, Corning, NY (US)

( * ) Notice: Subject to any disclaimer, the term of this patent is extended or adjusted under 35 U.S.C. 154(b) by 197 days.

(21) Appl. No.: 15/903,787

(22) Filed: Feb. 23, 2018

(65) Prior Publication Data
US 2018/0246257 A1    Aug. 30, 2018

Related U.S. Application Data

(60) Provisional application No. 62/463,320, filed on Feb. 24, 2017.

(51) Int. Cl.
| *G02B 1/11* | (2015.01) |
| *H01L 27/12* | (2006.01) |
| *H01L 21/68* | (2006.01) |
| *C03C 17/00* | (2006.01) |
| *C03C 3/06* | (2006.01) |
| *C03C 1/00* | (2006.01) |

(52) U.S. Cl.
CPC .................. *G02B 1/11* (2013.01); *C03C 1/00* (2013.01); *C03C 3/06* (2013.01); *C03C 17/002* (2013.01); *C03C 2201/42* (2013.01); *C03C 2217/73* (2013.01); *C03C 2217/732* (2013.01)

(58) Field of Classification Search
CPC ........... G02B 1/11; H01L 21/50; H01L 21/68; H01L 21/02422; H01L 27/12; Y10T 428/21
USPC ......................................................... 428/426
See application file for complete search history.

(56) References Cited

U.S. PATENT DOCUMENTS

| 7,416,472 B2 | 8/2008 | Moore et al. |
| 7,691,730 B2 | 4/2010 | Gadkaree et al. |
| 7,928,026 B2 | 4/2011 | Bookbinder et al. |
| 8,062,986 B2 | 11/2011 | Khrapko et al. |

(Continued)

FOREIGN PATENT DOCUMENTS

| JP | 2014517805 A | 7/2014 |
| JP | 2014151376 A | 8/2014 |
| WO | 2016115685 A1 | 7/2016 |

OTHER PUBLICATIONS

International Search Report and Written Opinion PCT/US2018/019421 dated Jun. 1, 2018.

(Continued)

*Primary Examiner* — Joanna Pleszczynska
(74) *Attorney, Agent, or Firm* — Smit Kapadia

(57) ABSTRACT

A glass wafer having a first major surface, a second major surface that is parallel to and opposite of the first major surface, a thickness between the first major surface and the second major surface, and an annular edge portion that extends from an outermost diameter of the glass wafer toward the geometrical center of the glass wafer. The glass wafer has a diameter from greater than or equal to 175 mm to less than or equal to 325 mm and a thickness of less than 0.350 mm. A width of the edge portion is less than 10 mm.

19 Claims, 4 Drawing Sheets

(56) References Cited

U.S. PATENT DOCUMENTS

| | | | | |
|---|---|---|---|---|
| 8,080,876 | B2* | 12/2011 | Andry | H01L 21/486 |
| | | | | 257/758 |
| 9,159,587 | B2 | 10/2015 | Canale et al. | |
| 9,221,289 | B2* | 12/2015 | Prest | B41M 5/24 |
| 9,227,295 | B2 | 1/2016 | Markham et al. | |
| 2003/0044577 | A1* | 3/2003 | Dhar | B32B 17/06 |
| | | | | 428/137 |
| 2007/0082179 | A1* | 4/2007 | Wade | G11B 7/0065 |
| | | | | 428/174 |
| 2010/0002312 | A1* | 1/2010 | Duparre | B29D 11/00365 |
| | | | | 359/741 |
| 2011/0189808 | A1 | 8/2011 | Watanabe | |
| 2012/0302063 | A1 | 11/2012 | Markham et al. | |
| 2013/0264672 | A1 | 10/2013 | Schreder et al. | |
| 2015/0085169 | A1 | 3/2015 | Igarashi et al. | |
| 2015/0087086 | A1 | 3/2015 | Yoshida et al. | |
| 2015/0228681 | A1 | 8/2015 | Pawlowski et al. | |
| 2016/0071981 | A1* | 3/2016 | Chuang | H01L 29/66742 |
| | | | | 438/166 |
| 2016/0096767 | A1 | 4/2016 | Markham et al. | |

OTHER PUBLICATIONS

Spectraglass: "Spectraglass—specialist glass solutions, Datasheet: P004", 2013, retrieved from: http://spectraglass.com/wp-content/uploads/2013/09/P004-Annular-Edge-Replacement-Sight-Glass.pdf.

Levola; "Diffractive Optics for Virtual Relaity Displays"; Journal of the SID; 14/5, (2006) pp. 467-475.

\* cited by examiner

HIGH ASPECT RATIO GLASS WAFER

CROSS-REFERENCE TO RELATED APPLICATIONS

This application claims the benefit of priority under 35 U.S.C. § 119 of U.S. Provisional Application Ser. No. 62/463,320, filed on Feb. 24, 2017, the content of which is relied upon and incorporated herein by reference in its entirety.

BACKGROUND

Field

The present specification generally relates to high aspect ratio glass wafers and, more specifically to high aspect ratio glass wafers having a large diameter, small edge exclusion, low bow, low warp, and low total thickness variation (TTV).

Technical Background

As components of visual display devices get more and more complex, such as, for example as virtual reality displays (VRD) light guides used in the devices are typically made from high index glass. The high index of refraction enables good performance, such as, for example, high field of view (FOV) when used in VRD. However, the surfaces of such light guides must be exceedingly parallel, with extremely tight tolerances for parameters such as total thickness variation (TTV), warp, and bow. The flatness requirement of the substrate surface is quite high, because a light beam directed toward the substrate is reflected off multiple surfaces of the substrate and/or adjacent layers and is transmitted through total internal reflection as it passes transversely across a portion of the substrate inside the plate several times and, thus, the surface error accumulates quickly. The number of reflections can be high, such as, for example, 10 reflections or more and, therefore, any inconsistencies in flatness are compounded tenfold. Further to the requirements that the glass substrates have high degrees of flatness, the substrates must be exceedingly thin to meet the production tolerances of the devices being produced.

Even though the demands for glass flatness and thinness are becoming more and more strict, it is more efficient to produce the glass in large wafers and then cut the wafer to the desired size of the substrate. Thus, glass wafers with high aspect ratios (i.e., high diameter to thickness ratio) are desirable. However, it becomes more difficult to maintain the TTV, bow, and warp of the glass as the size of the wafer is increased.

Accordingly, a need exists for glass wafers with large diameters, high aspect ratios, low bow, low warp, and low TTV.

SUMMARY

According to one embodiment, a glass wafer has a first major surface, a second major surface that is parallel to and opposite of the first major surface, a thickness between the first major surface and the second major surface. The glass wafer has a diameter from greater than or equal to 175 mm to less than or equal to 325 mm and a thickness of less than 0.350 mm. A width of the edge portion is less than 10 mm. According to some embodiments the glass wafer further comprises an annular edge portion that extends from an outermost diameter of the glass wafer toward the geometrical center of the glass wafer. A width of the edge portion is less than 10 mm. In some embodiments width of the edge portion is 0 to 10 mm. In some embodiments width of the edge portion is 0.2 mm to 10 mm.

In another embodiment, an optical, electrical, or mechanical device includes a glass wafer has a first major surface, a second major surface that is parallel to and opposite of the first major surface, a thickness between the first major surface and the second major surface, and an annular edge portion that extends from an outermost diameter of the glass wafer toward the geometrical center of the glass wafer. The glass wafer has a diameter from greater than or equal to 175 mm to less than or equal to 325 mm and a thickness of less than 0.350 mm. A width of the edge portion is less than 10 mm.

In yet another embodiment, a glass wafer includes a first major surface, a second major surface that is parallel to and opposite of the first major surface, a thickness between the first major surface and the second major surface, and an annular edge portion that extends from an outermost diameter of the glass wafer toward a geometrical center of the glass wafer. A diameter of the glass wafer is from greater than or equal to 200 mm to less than or equal to 325 mm and a thickness of the glass wafer is from greater than or equal to 0.225 mm to less than or equal to 0.325 mm. A width of the edge portion is less than 5 mm. A total thickness variation (TTV) of the glass wafer is less than 1 µm, a bow of the glass wafer is less than or equal to ±15 µm, and a warp of the glass wafer is less than or equal to 30 µm.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
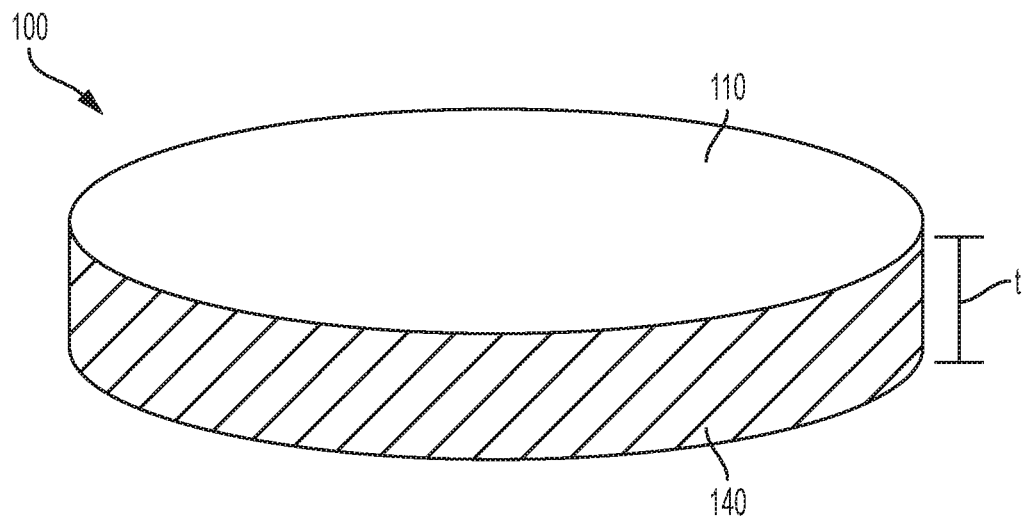
FIGS. 1A and 1B schematically depict side views of a glass wafer according to embodiments disclosed and described herein.

Reference will now be made in detail to embodiments of glass wafers having a high aspect ratio, embodiments of which are illustrated in the accompanying drawings. Whenever possible, the same reference numerals will be used throughout the drawings to refer to the same or like parts. In one embodiment a glass wafer has a first major surface, a second major surface that is parallel to and opposite of the first major surface, a thickness between the first major surface and the second major surface, and an annular edge portion that extends from an outermost diameter of the glass wafer toward the geometrical center of the glass wafer. According to some embodiments the glass wafer has a diameter from greater than or equal to 175 mm to less than or equal to 325 mm and a thickness of less than 0.350 mm. A width of the edge portion is less than 10 mm.

It is desirable to produce high quality glass wafers having a large diameter and small thickness from silica. However, limitations in forming and finishing glass wafers made from silica that have large diameters, small thickness, and good surface properties have heretofore prevented the formation of such glass wafers. For instance, glass wafers having a diameter of from about 100 mm to 150 mm and a thickness of about 0.5 mm or greater that also have good surface properties, such as low bow, low warp, and low TTV. However, as the diameter of the glass wafers increases, and as the thickness of the glass wafer decreases, it becomes more and more difficult to achieve a glass wafer that has good surface properties without fracturing the glass wafer during finishing.

As used herein, a "glass wafer" refers to wafers that comprise from 40 wt % to 100 wt % $SiO_2$ on an oxide basis. Within the class of glass wafers referred to herein, the term "silica glass wafers" refers to glass wafers that comprise from 90 wt % to 100 wt % $SiO_2$ on an oxide basis. Accordingly, as used herein, the term "glass wafer" includes the subclass of "silica glass wafers."

There are two key issues that hinder one from making glass wafers, such as, for example, silica glass wafers having large diameters, small thicknesses, and good surface properties: survivability of the glass wafer during processing, and achievement of the surface properties.

Regarding survivability, as the thickness of glass wafer, such as, for example, silica glass wafers, decreases and as the TTV of the glass wafer decreases, the edge of the glass wafer can no longer be processed using conventional techniques, such as, for example computer numeric control (CNC) machining. Therefore, the edge of the glass wafer may be chamfered, which can lead to damage.

Additionally, as the diameter of the glass wafer, such as, for example, a silica glass wafer, increases, it becomes more prone to damage during processing. For instance, a carrier for the glass wafer during processing generally has an annular shape and is made from plastic so that it does not scratch or chip the glass wafer. The carrier also generally will only contact the glass wafer at an edge portion so that the majority of the surface of the glass wafer may be polished. Accordingly, when polishing a glass wafer having a large diameter under such conditions, a large amount of pressure is exerted on the both the glass wafer and the carrier, which can cause damage to the glass wafer or cause the plastic carrier to break—thereby causing damage to the glass wafer. Thus, the survivability of glass wafers having large diameters and small thickness is difficult.

Regarding the achievability, as mentioned above, because of the large diameter and small thickness of the glass wafer, such as, for example, a silica glass wafer, high amounts of pressure are exerted on the carrier during polishing and, in some instances; this pressure causes the plastic carrier to break. Materials stronger than plastics, such as, for example, metals and the like cannot be used as carriers for the glass wafer because the glass on metal contact causes scratches and other unacceptable damage to the glass wafer. Thus, it can be difficult to manufacture a wafer having a large diameter and small thickness that also possesses the desired, bow, warp, and TTV.

An exemplary glass wafer 100, such as, for example, a silica glass wafer, according to embodiments described herein is depicted in FIG. 1. The glass wafer 100 is formed primarily from silica, such as comprising from greater than or equal to 40 wt % to less than or equal to 100 wt % $SiO_2$ on an oxide basis. In some embodiments, the glass wafer 100 is a silica glass wafer comprising from greater than or equal to 90 wt % to less than or equal to 100 wt % $SiO_2$. Accordingly, as used herein, a silica glass wafer is a subclass of a glass wafer. In some embodiments, the silica glass wafer comprises less than about 1000 parts per billion (ppb) by weight metal contaminants, such as less than 900 ppb metal contaminants, or even less than 800 ppb metal contaminants. In one or more embodiments, the silica glass wafer comprises less than about 100 parts per billion (ppb) by weight metal contaminants, such as less than 50 ppb metal contaminants, or even less than 20 ppb metal contaminants. In some embodiments, the silica glass wafer comprises less than 1000 parts per million (ppm) by weight OH groups, such as less than 900 ppm OH groups, or even less than 800 ppm OH groups. In one or more embodiments, the silica glass wafer comprises less than 100 parts per million (ppm) by weight OH groups, such as less than 50 ppm OH groups, less than 20 ppm OH groups, less than 10 ppm OH groups, or less than 5 ppm OH groups. In embodiments, the silica glass wafer comprises less than 100 ppm by weight OD groups, such as less than 50 ppm OD groups, less than 20 ppm OD groups, less than 10 ppm OD groups, or less than 5 ppm OD groups.

In some embodiments, the glass wafer, such as, for example, a silica glass wafer, may comprise $TiO_2$ to control the coefficient of thermal expansion (CTE) of the glass wafer and to increase the transmission of the glass wafer. In such embodiments that incorporate $TiO_2$ to modify the CTE and transmission of a glass wafer, $TiO_2$ is not considered a metal contaminant as described in the preceding paragraph. In embodiments, a glass wafer may comprise from greater than or equal to 0 wt % to less than or equal to 20 wt % $TiO_2$, such as from greater than or equal to 5 wt % to less than or equal to 15 wt % $TiO_2$, or from greater than or equal to 7 wt % to less than or equal to 7.5 wt % $TiO_2$. In other embodiments, a silica glass wafer comprises from greater than or equal to 0 wt % $TiO_2$ to less than or equal to 10 wt % $TiO_2$, such as, for example, from greater than or equal to 7 wt % $TiO_2$ to less than or equal to 7.5 wt % $TiO_2$. The above components may be characterized by ICP-MS and FTIR techniques, respectively as described in U.S. Pat. No. 7,928,026 and U.S. Pat. No. 8,062,986, both of which are incorporated herein by reference in their entirety.

According to embodiments, the glass wafer 100, such as, for example, a silica glass wafer, may have a refractive index of from greater than or equal to 1.45 to less than or equal to 1.90. The refractive index of a material describes the speed at which light propagates through the material. It is defined by the following equation (1):

$$n = \frac{c}{v} \qquad \text{Eq. (1)}$$

where n is the refractive index of a given material, c is the speed of light in a vacuum, and v is the phase velocity of light in the given material. As used herein, the "refractive index" is based on light with a wavelength of 589 nm. In some embodiments, the glass wafer 100 has a refractive index from greater than or equal to 1.50 to less than or equal to 1.90, such as from greater than or equal to 1.55 to less than or equal to 1.90, from greater than or equal to 1.60 to less than or equal to 1.90, from greater than or equal to 1.65 to less than or equal to 1.90, from greater than or equal to 1.70 to less than or equal to 1.90, from greater than or equal to 1.65 to less than or equal to 1.80, from greater than or equal to 1.65 to less than or equal to 1.75, from greater than or equal to 1.75 to less than or equal to 1.90, from greater than or equal to 1.80 to less than or equal to 1.90, or from greater than or equal to 1.85 to less than or equal to 1.90. In other embodiments, the glass wafer 100 has a refractive index from greater than or equal to 1.45 to less than or equal to 1.85, from greater than or equal to 1.45 to less than or equal to 1.80, from greater than or equal to 1.45 to less than or equal to 1.75, from greater than or equal to 1.45 to less than or equal to 1.70, from greater than or equal to 1.45 to less than or equal to 1.65, from greater than or equal to 1.45 to less than or equal to 1.60, from greater than or equal to 1.45 to less than or equal to 1.55, or from greater than or equal to 1.45 to less than or equal to 1.50. In still other embodiments the glass wafer has a refractive index from greater than or equal to 1.50 to less than or equal to 1.85, such as from greater than or equal to 1.55 to less than or equal to 1.80, from greater than or equal to 1.60 to less than or equal to 1.75, or from greater than or equal to 1.65 to less than or equal to 1.70.

Figure 1B:
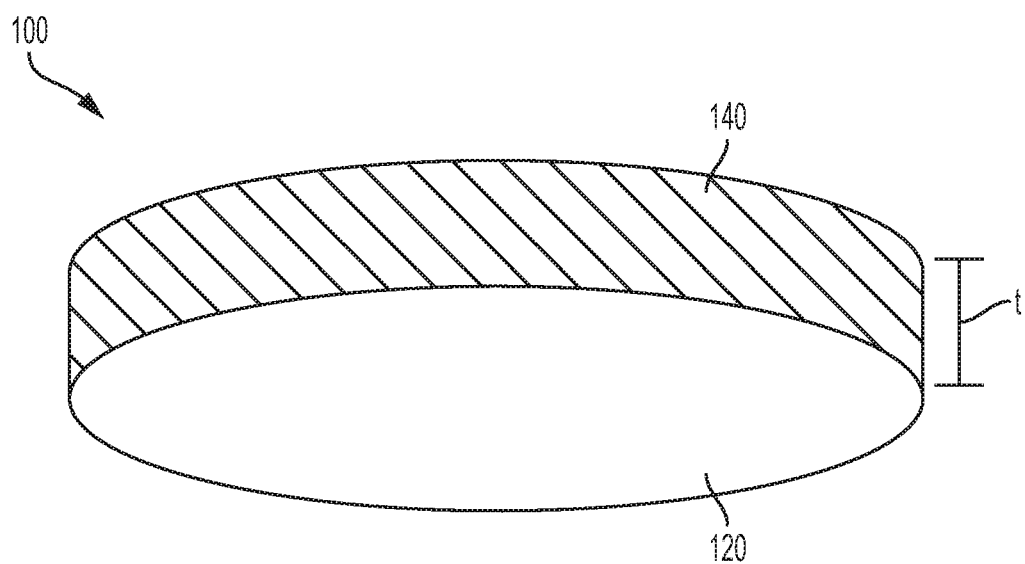

The glass wafer 100, such as, for example, a silica glass wafer, has a first major surface 110 and a second major surface 120 that is substantially parallel to, and opposite of, the first major surface 110. Exposed at the outermost diameter (i.e., along the circumference) of the glass wafer 100 is a sidewall 140 positioned between, and in contact with, the first major surface 110 and the second major surface 120. Together, the first major surface 110 and the second major surface 120 define a thickness, t, of the glass wafer 100. As used herein, the thickness t of the glass wafer 100 refers to the average distance between the first major surface 110 and the second major surface 120 as measured generally perpendicular to the first major surface 110 and the second major surface 120. It should be understood that FIGS. 1A and 1B are an exemplary schematic views that are used to describe various elements of glass wafers 100 according to embodiments and are not drawn to scale. In particular, the thickness t of the glass wafer 100 depicted in FIGS. 1A and 1B is not drawn to scale and is thinner than depicted in FIGS. 1A and 1B.

Figure 2:
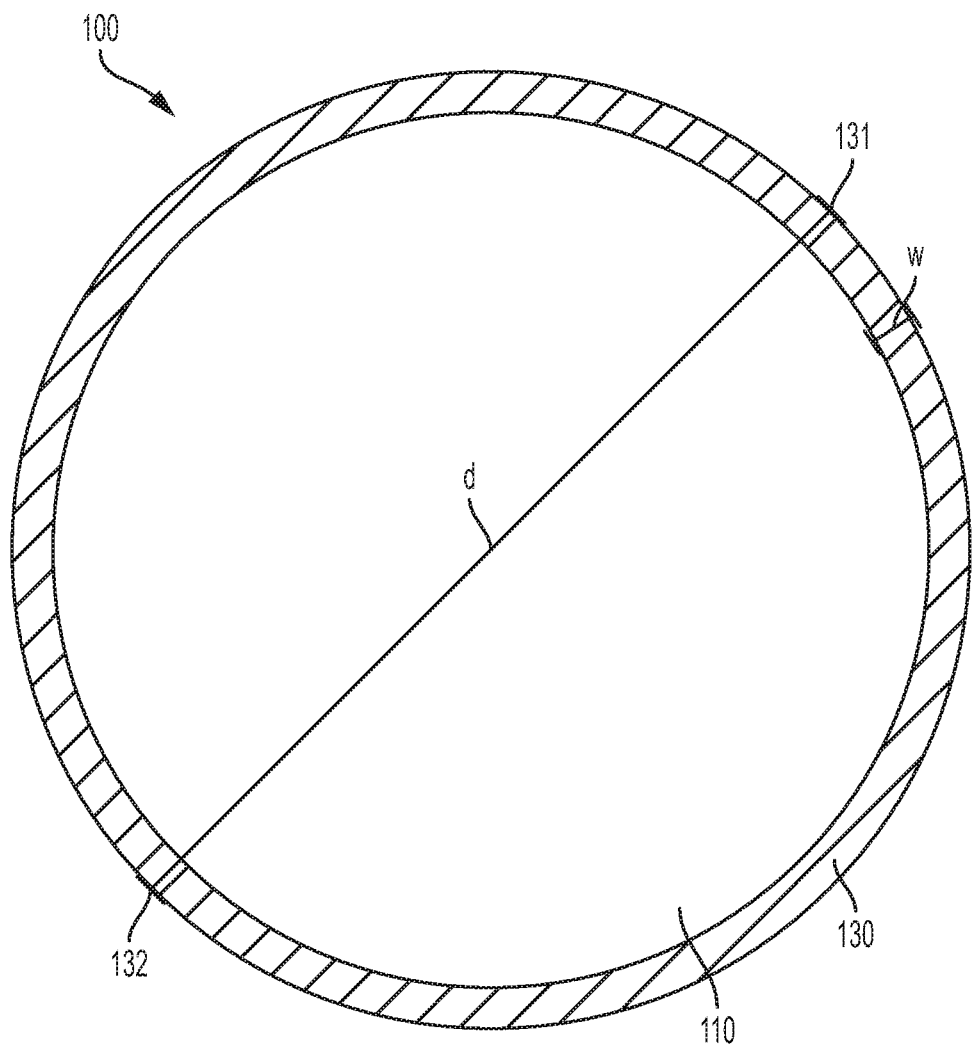
FIG. 2 schematically depicts a plan view of a glass wafer according to embodiments disclosed and described herein.

With reference now to FIG. 2, the glass wafer 100, such as, for example, a silica glass wafer, has a diameter d that extends in a straight line from a first position 131 on an edge portion 130 of the glass wafer through the geometrical center of the glass wafer 100 to a second position 132 on the edge portion 130 of the glass wafer. The diameter d of the glass wafer 100 is substantially constant regardless of the location of the first position 131 and the second position 132 along the circumference of the glass wafer 100. However, one of ordinary skill in the art would recognize that minor variances in the diameter d may occur as a result of inconsistencies in the manufacturing process. Accordingly, as used herein, the diameter d refers to the average diameter d of the glass wafer 100. The diameter d of the glass wafer 100 includes an annular edge portion 130 that extends from an exposed edge surface of the glass wafer 100 toward the geometrical center of the glass wafer 100.

As mentioned above, and with reference to FIGS. 1A, 1B, and 2, the glass wafer 100, such as, for example, a silica glass wafer, has a diameter d that extends in a straight line from a first point 131 on the edge of the glass wafer through the geometrical center of the glass wafer 100 to a second point 132 on the edge of the glass wafer. The glass wafers 100 according to embodiments disclosed and described herein are formed to have a relatively large diameter when compared to glass wafers conventionally described in the art. These large diameters allow the silica glass wafers to be used in multiple applications that may require larger diameter wafers, as well as provide for efficient formation of silica in a large wafer that can be divided in the sizes that are desired.

In embodiments, the diameter d of the glass wafer 100, such as, for example, a silica glass wafer, is from greater than or equal to 175 mm to less than or equal to 325 mm, such as from greater than or equal to 185 mm to less than or equal to 325 mm, greater than or equal to 195 mm to less than or equal to 325 mm, greater than or equal to 205 mm to less than or equal to 325 mm, greater than or equal to 215 mm to less than or equal to 325 mm, greater than or equal to 225 mm to less than or equal to 325 mm, greater than or equal to 235 mm to less than or equal to 325 mm, greater than or equal to 245 mm to less than or equal to 325 mm, greater than or equal to 250 mm to less than or equal to 325 mm, greater than or equal to 260 mm to less than or equal to 325 mm, greater than or equal to 270 mm to less than or equal to 325 mm, greater than or equal to 280 mm to less than or equal to 325 mm, greater than or equal to 290 mm to less than or equal to 325 mm, or greater than or equal to 300 mm to less than or equal to 325 mm. In other embodiments, the diameter d of the glass wafer 100 is from greater than or equal to 175 mm to less than or equal to 315 mm, such as from greater than or equal to 175 mm to less than or equal to 300 mm, from greater than or equal to 175 mm to less than or equal to 290 mm, from greater than or equal to 175 mm to less than or equal to 280 mm, from greater than or equal to 175 mm to less than or equal to 270 mm, from greater than or equal to 175 mm to less than or equal to 260 mm, from greater than or equal to 175 mm to less than or equal to 250 mm, from greater than or equal to 175 mm to less than or equal to 240 mm, from greater than or equal to 175 mm to less than or equal to 230 mm, from greater than or equal to 175 mm to less than or equal to 220 mm, from greater than or equal to 175 mm to less than or equal to 210 mm, or from greater than or equal to 175 mm to less than or equal to 200 mm. In still other embodiments, the diameter d of the glass wafer 100 is from greater than or equal to 200 mm to less than or equal to 300 mm, such as from greater than or equal to 210 mm to less than or equal to 290 mm, from greater than or equal to 220 mm to less than or equal to 280 mm, from greater than or equal to 230 mm to less than or equal to 270 mm, from greater than or equal to 240 mm to less than or equal to 260 mm, or from greater than or equal to 245 mm to less than or equal to 255 mm. It should be understood that the above ranges include all ranges and subranges between the ranges explicitly recited.

As disclosed above, although the diameter d of the glass wafers 100, such as, for example, a silica glass wafers, according to embodiments is substantially constant when measured at any point along the circumference of the glass wafer, one of ordinary skill in the art would recognize that minor variances in the diameter d of the glass wafer will be present as a result of the unpredictability in manufacturing. However, steps are taken to minimize any variance in the diameter d when measured at any point along the circumference of the glass wafer. As used herein, the variance in diameter is provided as an absolute value in comparison to the average diameter of the glass wafer. For instance, if a glass wafer has an average diameter of 250 mm and variance in diameter of ±0.20 mm, the glass wafer may have diameters from 249.8 mm to 250.2 mm. In embodiments, the variance in diameter d across the circumference of the glass wafer is ±0.20 mm or less, such as ±0.15 mm or less, or ±0.10 mm or less.

As stated above, for use in many applications, it is desirable that the glass wafer 100, such as, for example, a silica glass wafer, be relatively thin. Accordingly, the glass wafers 100 according to embodiments will have a large surface area—as defined by the diameter d of the glass wafer—and a relatively small thickness t defined by the distance between the first major surface 110 and the second major surface 120. The ratio of the diameter d of the glass wafer 100 compared to the thickness t of the glass wafer may be expressed by the aspect ratio of the glass wafer 100. Specifically, the aspect ratio of the glass wafer 100 is defined as the ratio of the diameter d of the glass wafer to the thickness t of the glass wafer. The aspect ratio is expressed herein as two numbers separated by a colon (e.g. 150:1). The numbers in the aspect ratio do not necessarily represent the actual value of the diameter d of the glass wafer 100 or the thickness of the glass wafer 100. Rather, they represent the relationship between the diameter d of the glass wafer 100 and the thickness of the glass wafer 100. For example, a glass wafer 100 with a diameter d of 300 mm and a thickness t of 0.2 mm would have an aspect ratio expressed as 1500:1.

In one or more embodiments disclosed herein, the aspect ratio may be from greater than or equal to 475:1 to less than or equal to 700:1, such as from greater than or equal to 500:1 to less than or equal to 700:1, from greater than or equal to 525:1 to less than or equal to 700:1, from greater than or equal to 550:1 to less than or equal to 700:1, from greater than or equal to 575:1 to less than or equal to 700:1, from greater than or equal to 600:1 to less than or equal to 700:1, from greater than or equal to 625:1 to less than or equal to 700:1, from greater than or equal to 650:1 to less than or equal to 700:1, or from greater than or equal to 675:1 to less than or equal to 700:1. In other embodiments, the aspect ratio may be from greater than or equal to 475:1 to less than or equal to 675:1, from greater than or equal to 475:1 to less than or equal to 650:1, from greater than or equal to 475:1 to less than or equal to 625:1, from greater than or equal to 475:1 to less than or equal to 600:1, from greater than or equal to 475:1 to less than or equal to 575:1, from greater than or equal to 475:1 to less than or equal to 550:1, from greater than or equal to 475:1 to less than or equal to 525:1, or from greater than or equal to 475:1 to less than or equal to 500:1. In still other embodiments, the aspect ratio may be from greater than or equal to 500:1 to less than or equal to 675:1, from greater than or equal to 525:1 to less than or equal to 650:1, from greater than or equal to 550:1 to less than or equal to 625:1, or from greater than or equal to 575:1 to less than or equal to 600:1. It should be understood that the above ranges include all ranges and subranges between the ranges explicitly recited.

As described above, the glass wafers 100, such as, for example, a silica glass wafers, according to embodiments have a relatively large diameter d and a relatively small thickness t, which may be expressed in the aspect ratio of the glass wafer 100 disclosed above. To achieve these aspect ratios, the thickness t of the glass wafer is, according to embodiments, less than 0.350 mm, such as less than 0.325 mm, less than 0.300 mm, less than 0.275 mm, less than 0.250 mm, or less than 0.225 mm. In some embodiments, the thickness t of the glass wafer 100 may be from greater than or equal to 0.225 mm to less than or equal to 0.325 mm, such as from greater than or equal to 0.235 mm to less than or equal to 0.325 mm, from greater than or equal to 0.245 mm to less than or equal to 0.325 mm, from greater than or equal to 0.255 mm to less than or equal to 0.325 mm, from greater than or equal to 0.265 mm to less than or equal to 0.325 mm, from greater than or equal to 0.275 mm to less than or equal to 0.325 mm, from greater than or equal to 0.285 mm to less than or equal to 0.325 mm, from greater than or equal to 0.295 mm to less than or equal to 0.325 mm, from greater than or equal to 0.305 mm to less than or equal to 0.325 mm, or from greater than or equal to 0.315 mm to less than or equal to 0.325 mm. In other embodiments, the thickness t of the glass wafer 100 may be from greater than or equal to 0.225 mm to less than or equal to 0.315 mm, from greater than or equal to 0.225 mm to less than or equal to 0.295 mm, from greater than or equal to 0.225 mm to less than or equal to 0.285 mm, from greater than or equal to 0.225 mm to less than or equal to 0.275 mm, from greater than or equal to 0.225 mm to less than or equal to 0.265 mm, from greater than or equal to 0.225 mm to less than or equal to 0.255 mm, from greater than or equal to 0.225 mm to less than or equal to 0.245 mm, or from greater than or equal to 0.225 mm to less than or equal to 0.235 mm. In still other embodiments, the thickness t of the glass wafer 100 may be from greater than or equal to 0.235 mm to less than or equal to 0.315 mm, from greater than or equal to 0.245 mm to less than or equal to 0.305 mm, from greater than or equal to 0.255 mm to less than or equal to 0.295 mm, or from greater than or equal to 0.265 mm to less than or equal to 0.285 mm. It should be understood that the above ranges include all ranges and subranges between the ranges explicitly recited.

In addition to the large diameter d and small thickness t of the glass wafer 100, such as, for example, a silica glass wafer, that are required for certain applications, in embodiments the quality of the first major surface 110 and the second major surface 120 is controlled for certain applications. The quality of the first major surface 110 and the second major surface 120 of the glass wafer can be quantified by measuring the TTV, bow, and warp of the glass wafer 100. It should be understood that each of these measurements are independent and various embodiments may have any combination of values of TTV, bow, and warp disclosed below.

The TTV of the glass wafer 100, such as, for example, a silica glass wafer, is measured as defined in ASTM F657. Namely, the TTV is the difference between the maximum and minimum values of thickness encountered during a scan pattern or series of point measurements of first major surface 110 and the second major surface 120 of the glass wafer 100. In embodiments, the glass wafer 100 has a TTV of less than 5 µm. In other embodiments, the glass wafer 100 has a TTV of less than or equal to 4 µm, such as less than or equal to 3 µm, less than or equal to 2 µm, or less than or equal to 1 µm. It should be understood that the above ranges include all ranges and subranges between the ranges explicitly recited. If the TTV of the glass wafer is too high, the amount of distortion in the glass wafer will increase, particularly in applications where the light is reflected off of multiple surfaces in the glass wafer.

According to embodiments, the glass wafer 100, such as, for example, a silica glass wafer, may have a relatively small bow and/or warp. As described by ASTM F534, "bow" refers to the deviation of the center point of the median surface to a reference plane. Similarly, as described by ASTM F1390, "warp" refers to the difference between the maximum and minimum distances of the median surface from the reference plane. (Median surface, as taught by ASTM F534 or ASTM F1390, is an "imaginary" surface that is internal to the wafer, calculated to be equal-distal from the first major surface 110 and the second major surface 120 of the glass wafer.)

According to embodiments, the glass wafer 100, such as, for example, a silica glass wafer, may have a bow of less than ±40 µm. In other embodiments, the glass wafer 100 may have a bow of less than or equal to ±35 µm, such as less than or equal to ±30 µm, less than or equal to ±25 µm, less than or equal to ±20 µm, less than or equal to ±15 µm, or less than or equal to ±10 µm. It should be understood that the above ranges include all ranges and subranges between the ranges explicitly recited. If the bow of the glass wafer is too high, the amount of distortion in the glass wafer will increase, particularly in applications where the light is reflected off of multiple surfaces in the glass wafer and/or adjacent layers and is transmitted through total internal reflection as it passes transversely across a portion of the glass wafer.

According to embodiments, the glass wafer 100, such as, for example, a silica glass wafer, may have a warp of less than or equal to 45 µm. In other embodiments, the glass wafer 100 may have a warp less than or equal to 40 µm, less than or equal to 35 µm, less than or equal to 30 µm, less than or equal to 25 µm, less than or equal to 20 µm, less than or equal to 15 µm, or less than or equal to 10 µm. It should be understood that the above ranges include all ranges and subranges between the ranges explicitly recited. If the warp of the glass wafer is too high, the amount of distortion in the glass wafer will increase, particularly in applications where the light is reflected off of multiple surfaces in the glass wafer and/or adjacent layers and is transmitted through total internal reflection as it passes transversely across a portion of the glass wafer.

In addition to the bow and warp of first major surface 110 and the second major surface 120 of the glass wafer, such as, for example, a silica glass wafer, the quality of the glass wafer, and particularly the quality of the first major surface 110 and the second major surface 120, may be quantified by measuring the optical wedge of at least one of the first major surface 110 and the second major surface 120. The optical wedge refers to an angle between two plane surfaces. In general, the optical wedge may range from a few millionths of a degree to as much as three degrees. The optical wedge is measured in seconds of arc (arc-sec). In embodiments, the glass wafer 100 has an optical wedge of less than 0.030 arc-sec. In other embodiments, the glass wafer 100 has an optical wedge of less than or equal to 0.025 arc-sec, such as less than or equal to 0.020 arc-sec, less than or equal to 0.015 arc-sec, or less than or equal to 0.010 arc-sec. It should be understood that the above ranges include all ranges and subranges between the ranges explicitly recited.

In some embodiments, it may be desirable for at least one of the first major surface 110 and the second major surface to be relatively smooth so as to not disrupt the optical properties of the glass wafer 100, such as, for example, a silica glass wafer. Rough surfaces increase light scattering and reflectivity in the visible light range. In one or more embodiments, rough surfaces can decrease intensity and contrast when the glass wafer 100 is utilized in imaging systems. In at least one embodiment, at least one of the first major surface 110 and the second major surface 120 may have a surface roughness ($R_a$) of less than or equal to 2 nm. Surface roughness ($R_a$) may be characterized by the following equation (4):

$$R_a = \frac{1}{n}\sum_{i=1}^{n}|y_i| \qquad \text{eq. (4)}$$

where y represents the value of a measured height and n represents the number of measurements taken. In some embodiments, at least one of the first major surface 110 and the second major surface 120 may have a surface roughness ($R_a$) of less than or equal to about 1.5 nm, less than or equal to about 1.0 nm, or less than or equal to 0.5 nm.

With reference now to FIG. 2, according to embodiments, the glass wafer 100, such as, for example, a silica glass wafer, comprises an annular edge portion 130 present at the outer circumference of the glass wafer 100. The edge portion surrounds the clear aperture of the glass wafer. As used herein, the term "clear aperture" (or CA), refers to a finished portion of the glass wafer of that has properties, such as, for example, optical properties, that meet one or more specified values. The term clear aperture diameter refers to an outer edge of the clear aperture portion of the glass wafer. In contrast, the edge portion 130 will not have properties that meet one or more of the specified values. The specified values will be determined by the desired end use of the glass wafer and may be different in various embodiments. The specified values are generally selected from one or more of the surface roughness, the bow, the warp, and the TTV values described above as well as the haze, the stain, the wedge, and the scratch-dig values described herein.

The edge portion 130 extends from the outermost diameter of the glass wafer 100 toward the geometrical center of the glass wafer 100 for a distance referred to herein as the width w of the edge portion 130. The width w of the edge portion 130 is substantially constant around the circumference of the glass wafer 100. However, one of ordinary skill in the art will recognize that there may be small variances in the width w of the edge portion 130 due to manufacturing inconsistencies. The edge portion is a product of the finishing of the glass wafer 100. For instance, in embodiments, a ring holder is used to hold the glass wafer 100 when it undergoes finishing processes such as, for example, coating the glass wafer. It should be understood that the ring holder need not be present for every step of the finishing process. The ring holder is named as such because of its annular shape. Accordingly, the ring holder contacts the glass wafer 100 at or near the edge portion 130 and holds the glass wafer 100 while the coating processes are conducted. In case of coated glass wafers, this leads to an annular edge portion 130 that does not have the coating of the remainder ("clear aperture" portion of) of the coated glass wafer 100. In the exemplary embodiments described herein the edge portion 130 does not have the finish of the clear aperture, and may also have superficial damage, such as, for example, scratches, indentations, cracks, microcracks, etc. However, the clear aperture is a relatively pristine surface that is usable in many applications. Accordingly, it is desirable to keep the width w of the edge portion 130 as small as possible.

In embodiments, the width w of the edge portion 130 is less than 10 mm, such as less than or equal to 9 mm, less than or equal to 8 mm, less than or equal to 7 mm, or less than or equal to 6 mm. In other embodiments, the width w of the edge portion 130 is less than or equal to 5 mm, such as less than or equal to 4 mm, or less than or equal to 3 mm (for example 0 mm to 5 mm, 0.2 mm to 5 mm, 0 mm to 3 mm, or 0.2 mm to 3 mm).

The quality of the clear aperture is provided, in part, by various finishing processes, such as polishing, grinding, and other surface treatments. With reference to FIGS. 1A and 1B, in one or more embodiments, a ring holder is placed around the circumference of the glass wafer, such as, for example, a silica glass wafer, thereby contacting the sidewall 140 of the glass wafer 100, such as, for example, a silica glass wafer. The ring holder secures the glass wafer during various finishing processes, such as, for example, polishing. However, according to some embodiments, the finishing processes are not conducted on the entire surface of the glass wafer. For instance, in one or more embodiments and with reference to FIG. 2, the finishing processes are not conducted on the edge portion 130 of the glass wafer 100. In some embodiments at least a part of the edge portion 130 may comprise a chamfer where the surface of the glass wafer is angled from one or more of the major surfaces 110, 120 to the sidewall 140. The angle of the chamfer is not particularly limited, and in some embodiments may be an angle of 15° to about 75° measured from the plane of the adjacent major surface. This chamfered part of the edge portion results in a sidewall 140 that does not span the entire thickness t of the glass wafer 100. In one or more embodiments, the sidewall 140 comprises from 50% to 70% of the wafer thickness t, such as from 55% to 65% of the wafer thickness t. Thus, as an example, for a wafer having a thickness of 0.2 mm, the sidewall may be from 0.1 mm to 0.14 mm. It should be understood that the chamfered portion of the edge portion 130 is not included in the measurement of the bow, warp, and TTV. In addition, it should be understood that because the chamfered part of the glass wafer is not on the same plane as the first major surface 110 or the second major surface 120, the chamfered part of the glass wafer will not receive the same finishing treatment as the first major surface 110 and the second major surface.

As described above, in embodiments, the glass wafer 100, such as, for example, a silica glass wafer, is divided into an edge portion 130 and a clear aperture, and the edge portion 130 may have superficial damage. However, the clear aperture is a relatively pristine surface that is usable in many applications. Various properties of the clear aperture are described below.

The clear aperture generally transmits light from the first major surface 110 or the second major surface 120 of the glass wafer 100, such as, for example, a silica glass wafer, through the glass wafer 100 and to the other of the first major surface 110 or second major surface 120. Haze occurs when the light is reflected from the surface of the glass wafer 100 that is exposed to the light, when light is refracted within the glass wafer 100, when light is reflected from the surface of the glass wafer 100 that is not exposed to the light, and when light passes through the glass wafer at an angle determined by the refractive index of the glass wafer 100, which is described above. The haze of the glass wafer may be measured according to ASTM D1003. According to embodiments, inside the clear aperture the glass wafer 100 has a haze of less than 1%. In other embodiments, the glass wafer 100 has a haze of 0%.

In addition to haze, glass wafers, such as, for example, silica glass wafers, may have a stain caused by contamination of fine organic and/or inorganic species on the surface of the glass. Stain can be measured in a similar matter as haze discussed above, but tends to be local in nature—i.e., where the contamination is present and is not consistent across the surface of the glass wafer. In embodiments, the glass wafer has a stain of about 0.

Another measurable property of the glass wafer, such as, for example, a silica glass wafer, surface is the scratch-dig as described in MIL-O-13830. The scratch-dig sets a limit on the amount of area surface defects occupy relative to the overall clear aperture of the glass wafer. A scratch is defined as any marking or tearing of the wafer surface, and a dig is defined as a small rough spot in the glass wafer surface and includes bubbles and stains. The scratch-dig is represented by two numbers separated by a slash, such as 60/40. The first number defines a scratch width (in microns) according to a visual standard, and the second number refers to digs and establishes a limit to the actual size of the digs (in ×10 microns). In embodiments the scratch-dig of the glass wafer may be 40/20 or less, such as 20/10 or less. In some embodiments, for example, the annular an annular edge portion 130 may have scratch-dig of greater than 40/20.

Figure 3:
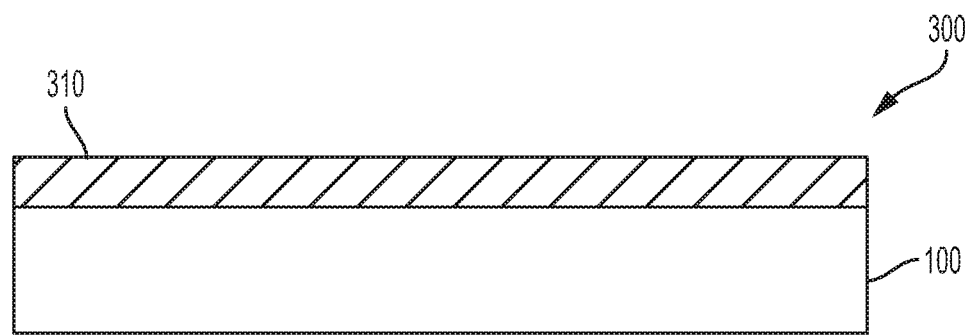
FIG. 3 schematically depicts a coated glass wafer according to embodiments disclosed an described herein.

In some embodiments, the glass wafers, such as, for example, silica glass wafers, described hereinabove may have coatings. In certain embodiments, the coating may be an antireflective coating. With reference now to FIG. 3, according to this embodiment, a coated glass wafer 300, such as, for example, a silica glass wafer, comprises a glass wafer 100 having an anti reflective coating 310 on one of its major surfaces. The anti reflective coating 310 may comprise an air-side surface and may be in contact with a major surface of the glass wafer 100. As used herein, the term "contact" can mean either direct contact or indirect contact. Direct contact refers to contact in the absence of intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other. Elements in contact may be rigidly or non-rigidly joined. Contacting refers to placing two elements in direct or indirect contact. Elements in direct contact may be said to directly contact each other. Elements in indirect contact may be said to indirectly contact each other. It should be understood that when two elements are "in contact" with one another, in some embodiments, they are in direct contact with one another. It should be understood that FIG. 3 is illustrative only and is not drawn to scale.

As used herein, an anti reflective coating 310 refers to a coating that has relatively low reflectance (i.e., high transmission) at one or more wavelengths. In one or more embodiments, the coated glass wafer 300 may have a reflectance of less than or equal to about 0.2% over all wavelengths from 450 nm to 700 nm when viewed on a surface comprising an AR coating 120 at an angle of incidence of less than or equal to about 10°. Reflectance is a property of a surface that describes the relative amount of light reflected by the surface. Reflectance is defined as the intensity of light reflected divided by the intensity of the incident light and may be expressed as a percentage. Reflectance may vary for a given material based on the wavelength of incident light and the angle of incidence. Reflectance may be measured over a range of wavelengths of visible light (i.e. 450 nm to 700 nm). Unless otherwise mentioned, reflectance as referenced herein is measured at an angle of incidence less than or equal to about 10° (relative to normal to the surface of the reflective coating).

The anti reflective coating 310 may comprise materials such as, without limitation, $SiO_2$, $Al_2O_3$, $GeO_2$, $SiO$, $AlO_xN_y$, $AlN$, $SiN_x$, $SiO_xN_y$, $Si_uAl_vO_xN_y$, $Ta_2O_5$, $Nb_2O_5$, TiO$_2$, ZrO$_2$, TiN, MgO, MgF$_2$, BaF$_2$, CaF$_2$, SnO$_2$, HfO$_2$, Y$_2$O$_3$, MoO$_3$, DyF$_3$, YbF$_3$, YbF$_x$O$_y$, YF$_3$, CeF$_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, or other materials known or to be discovered in the art.

Figure 4:
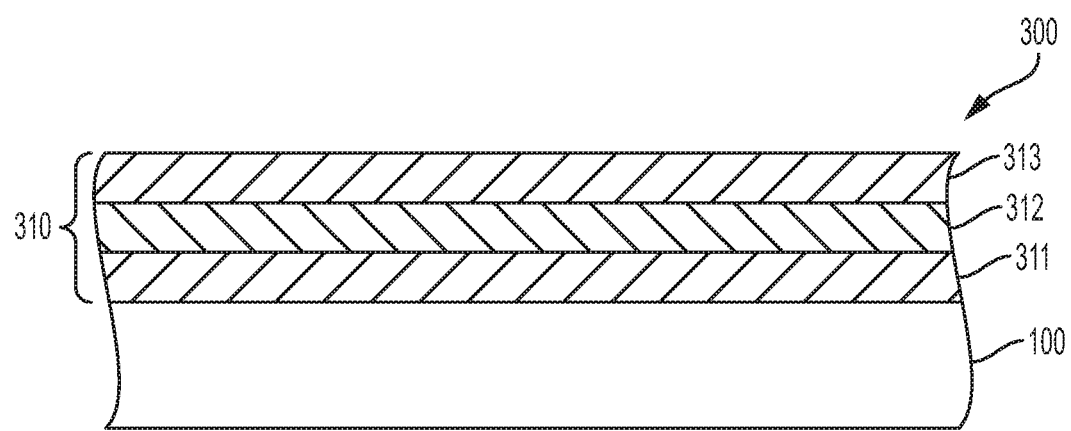
FIG. 4 schematically depicts a coated glass wafer having a layered coating structure according to embodiments disclosed and described herein.

The anti reflective coating 310 of one or more embodiments may comprise multiple layers. One of such embodiments is depicted in FIG. 4. The layers 311, 312, and 313 of the anti reflective coating 310 may be in contact with a first major surface of the glass wafer 100, such as, for example, a silica glass wafer, and/or in contact with another layer. In one or more embodiments, only one layer is in contact with the major surface of the glass wafer 100. In one or more embodiments, each layer is applied in such a manner that no layer is in contact with more than two other layers. It should be understood that FIG. 4 is illustrative only and is not drawn to scale.

In some embodiments, additional or alternative coatings may be used. In one or more embodiments, a UV filtering coating, an infrared absorbing coating, and the like may be applied to the glass wafer, such as, for example, a silica glass wafer. Any suitable coating known now or later developed may be applied to the glass wafer depending on the desired use of the wafer.

The glass wafer 100, such as, for example, a silica glass wafer, according to embodiments may be used in various devices, such as, but not limited to, virtual reality displays, circuitry, or integrated circuits, MEMS, LED, CIS, c-PV, memory, Logic ICs, RF/Analog ICs, microfluidic devices, microdisplays, Laser/VCSEL, fuel cells, microbatteries, power devices, optical and physical sensors, antennas, filters, spectrometers, measurement devices, microwave devices, cover glasses, protective covers, gratings, connectors, optical couplings, and the like. In addition, glass wafers 100 according to embodiments may be used in optical devices, such as in waveguides, as lenses, etc. Further, glass wafers according to embodiments may be used insulating materials and interposers.

According to a first clause, a glass wafer comprises: a first major surface; a second major surface that is parallel to and opposite of the first major surface; a thickness between the first major surface and the second major surface; and an annular edge portion that extends from an outermost diameter of the glass wafer toward a geometrical center of the glass wafer, wherein a diameter of the glass wafer is from greater than or equal to 175 mm to less than or equal to 325 mm, the thickness is less than 0.350 mm, and a width of the edge portion is less than 10 mm.

A second clause includes the glass wafer of the first clause, wherein the diameter of the glass wafer is from greater than or equal to 200 mm to less than or equal to 300 mm.

A third clause includes the glass wafer of any one of the first and second clauses, wherein the thickness is from greater than or equal to 0.225 mm to less than or equal to 0.325 mm.

A fourth clause includes the glass wafer of any one of the first through third clauses, wherein the width of the edge portion is less than 5 mm.

A fifth clause includes the glass wafer of any one of the first through fourth clauses, wherein an aspect ratio of the glass wafer is from greater than or equal to 475:1 to less than or equal to 700:1.

A sixth clause includes the glass wafer of any one of the first through fifth clauses, wherein a variance in diameter d across a circumference of the glass wafer is ±0.20 mm or less.

A seventh clause includes the glass wafer of any one of the first through sixth clauses, wherein the glass wafer has a total thickness variation (TTV) of less than 5 µm.

An eighth clause includes the glass wafer of any one of the first through seventh clauses, wherein the glass wafer has a bow of less than or equal to ±35 µm.

A ninth clause includes the glass wafer of any one of the first through eighth clauses, wherein the glass wafer has a warp of less than or equal to 45 µm.

A tenth clause includes the glass wafer of any one of the first through ninth clauses, wherein the glass wafer has an optical wedge of less than 0.030 arc-sec.

An eleventh clause includes the glass wafer of any one of the first through tenth clauses, wherein the glass wafer has a scratch-dig of 40/20 or less.

A twelfth clause includes the glass wafer of any one of the first through eleventh clauses, wherein the glass wafer further comprises an anti-reflective coating.

A thirteenth clause includes an optical, electrical, or mechanical device comprising the glass wafer of any one of first through twelfth clauses.

A fourteenth clause includes a glass wafer comprising: a first major surface; a second major surface that is parallel to and opposite of the first major surface; a thickness between the first major surface and the second major surface; and an annular edge portion that extends from an outermost diameter of the glass wafer toward a geometrical center of the glass wafer, wherein a diameter of the glass wafer is from greater than or equal to 200 mm to less than or equal to 325 mm, the thickness is from greater than or equal to 0.225 mm to less than or equal to 0.325 mm, a width of the edge portion is less than 5 mm, a total thickness variation (TTV) of the glass wafer is less than 1 µm, a bow of the glass wafer is less than or equal to ±15 µm, and a warp of the glass wafer is less than or equal to 30 µm.

A fifteenth clause includes the glass wafer of the fourteenth clause, wherein the glass wafer has a refractive index from greater than or equal to 1.45 to less than or equal to 1.90.

A sixteenth clause includes the glass wafer of any one of the fourteenth and fifteenth clauses, wherein the glass wafer has a surface roughness (Ra) of less than or equal to 2 nm.

A seventeenth clause includes the glass wafer of any one of the fourteenth through fifteenth clauses, wherein the glass wafer has a scratch-dig of 20/10 or less.

An eighteenth clause includes the glass wafer of any one of the fourteenth through seventeenth clauses, wherein the glass wafer has an optical wedge of less than 0.030 arc-sec.

A nineteenth clause includes the glass wafer of any one of the fourteenth through eighteenth clauses, wherein a variance in diameter d across a circumference of the glass wafer is ±0.20 mm or less.

A twentieth clause includes the glass wafer of any one of the fourteenth through nineteenth clauses, wherein the glass wafer further comprises an anti-reflective coating.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass wafer comprising:
   a first major surface;
   a second major surface that is parallel to and opposite the first major surface;
   a thickness between the first major surface and the second major surface; and
   an annular edge portion that extends from an outermost diameter of the glass wafer toward a geometrical center of the glass wafer, wherein a width of the annular edge portion is 0.2 mm to 5 mm, wherein the annular edge portion comprises a chamfer having an angle of 15° to about 75°,
   wherein a diameter of the glass wafer is from greater than or equal to 205 mm to less than or equal to 325 mm,
   wherein a variance in diameter d across a circumference of the glass wafer is ±0.20 mm or less, and
   wherein the thickness of the glass wafer is less than 0.350 mm.

2. A glass wafer comprising:
   a first major surface;
   a second major surface that is parallel to and opposite the first major surface;
   a thickness between the first major surface and the second major surface; and
   an annular edge portion that extends from an outermost diameter of the glass wafer toward a geometrical center of the glass wafer, wherein
   a diameter of the glass wafer is from greater than or equal to 175 mm to less than or equal to 325 mm, wherein a variance in diameter d across a circumference of the glass wafer is ± 0.20 mm or less,
   the thickness is less than 0.350 mm, and
   a width of the annular edge portion is 0.2 mm to 5 mm.

3. The glass wafer of claim 1, wherein the diameter of the glass wafer is from greater than or equal to 200 mm to less than or equal to 300 mm.

4. The glass wafer of claim 1, wherein the thickness is from greater than or equal to 0.225 mm to less than or equal to 0.325 mm.

5. The glass wafer of claim 2, wherein the width of the annular edge portion is 0.2 mm to 3 mm.

6. The glass wafer of claim 2, wherein an aspect ratio of the glass wafer is from greater than or equal to 475:1 to less than or equal to 700:1.

7. The glass wafer of claim 1, wherein the glass wafer has a total thickness variation (TTV) of less than 5 μm.

8. The glass wafer of claim 1, wherein the glass wafer has a bow of less than or equal to 35 μm.

9. The glass wafer of claim 1, wherein the glass wafer has a warp of less than or equal to 45 μm.

10. The glass wafer of claim 1, wherein the glass wafer has an optical wedge of less than 0.030 arc-sec.

11. The glass wafer of claim 1, wherein the glass wafer has a scratch-dig of 40/20 or less.

12. The glass wafer of claim 1, wherein the glass wafer further comprises an anti-reflective coating.

13. An optical, electrical, or mechanical device comprising the glass wafer of claim 1.

14. A glass wafer comprising:
    a first major surface;
    a second major surface that is parallel to and opposite the first major surface;
    a thickness between the first major surface and the second major surface; and
    an annular edge portion that extends from an outermost diameter of the glass wafer toward a geometrical center of the glass wafer, wherein the annular edge portion surrounds a finished portion of the glass wafer, and wherein
    a diameter of the glass wafer is from greater than or equal to 200 mm to less than or equal to 325 and wherein a variance in diameter d across a circumference of the glass wafer is ±0.20 mm or less,
    the thickness is from greater than or equal to 0.225 mm to less than or equal to 0.325 mm,
    a width of the annular edge portion is 0.2 mm to 5 mm,
    a total thickness variation (TTV) of the glass wafer is less than 1 μm,
    a bow of the glass wafer is less than or equal to ±15 μm, and
    a warp of the glass wafer is less than or equal to 30 μm.

15. The glass wafer of claim 14, wherein the glass wafer has a refractive index from greater than or equal to 1.45 to less than or equal to 1.90.

16. The glass wafer of claim 14, wherein the glass wafer has a surface roughness ($R_a$) of less than or equal to 2 nm.

17. The glass wafer of claim 14, wherein the glass wafer has a scratch-dig of 20/10 or less.

18. The glass wafer of claim 14, wherein the glass wafer has an optical wedge of less than 0.030 arc-sec.

19. The glass wafer of claim 14, wherein the glass wafer further comprises an anti-reflective coating.

* * * * *

UNITED STATES PATENT AND TRADEMARK OFFICE
CERTIFICATE OF CORRECTION

PATENT NO. : 10,935,698 B2
APPLICATION NO. : 15/903787
DATED : March 2, 2021
INVENTOR(S) : Michael Lucien Genier et al.

It is certified that error appears in the above-identified patent and that said Letters Patent is hereby corrected as shown below:

On the Title Page

On page 2, in Column 1, item (56), Other Publications, Line 5, delete "Relaity" and insert -- Reality --, therefor.

In the Claims

In Column 15, Line 13, Claim 1, delete "75° ," and insert -- 75°, --, therefor.

In Column 16, Line 25, Claim 14, delete "325" and insert -- 325 mm --, therefor.

Signed and Sealed this
First Day of August, 2023

Katherine Kelly Vidal
*Director of the United States Patent and Trademark Office*